(12) United States Patent
Adibhatla

(10) Patent No.: US 10,794,286 B2
(45) Date of Patent: Oct. 6, 2020

(54) METHOD AND SYSTEM FOR MODULATED TURBINE COOLING AS A FUNCTION OF ENGINE HEALTH

(71) Applicant: General Electric Company, Schenectady, NY (US)

(72) Inventor: Sridhar Adibhatla, Glendale, OH (US)

(73) Assignee: General Electric Company, Schenectady, NY (US)

( * ) Notice: Subject to any disclaimer, the term of this patent is extended or adjusted under 35 U.S.C. 154(b) by 600 days.

(21) Appl. No.: 15/044,475

(22) Filed: Feb. 16, 2016

(65) Prior Publication Data
US 2017/0234224 A1    Aug. 17, 2017

(51) Int. Cl.
*F02C 7/12*    (2006.01)
*F02C 9/18*    (2006.01)
(Continued)

(52) U.S. Cl.
CPC .............. *F02C 7/12* (2013.01); *F02C 9/00* (2013.01); *F02C 9/18* (2013.01); *F02K 3/02* (2013.01); *G05B 23/0289* (2013.01); *F05D 2260/20* (2013.01); *F05D 2260/80* (2013.01); *F05D 2260/81* (2013.01); *F05D 2270/07* (2013.01);
(Continued)

(58) Field of Classification Search
CPC .... F02C 7/12; F02C 7/125; F02C 7/18; F02C 7/185; F02C 9/00; F02C 9/18; F02C 9/28; F02C 6/08; F02K 3/02; G05B 23/0283; F05D 2260/20; F05D 2260/80; F05D 2260/81; F05D 2270/07; F05D 2270/11;
(Continued)

(56) References Cited

U.S. PATENT DOCUMENTS 2,929,224 A   3/1960   Pickard et al.
3,712,756 A   1/1973   Kalikow et al.
(Continued)

FOREIGN PATENT DOCUMENTS

EP    2 730 767 A2    5/2014
GB    2 516 080 A    1/2015

OTHER PUBLICATIONS

Extended European Search Report and Opinion issued in connection with corresponding EP Application No. 17155681.4 dated Jul. 18, 2017.
(Continued)

*Primary Examiner* — Mark A Laurenzi
*Assistant Examiner* — Loren C Edwards
(74) *Attorney, Agent, or Firm* — Dority & Manning, P.A.

(57) ABSTRACT

A method of modulating cooling flow to an engine component based on a health of the component is provided. The method includes determining a cooling flow requirement of the engine component for each of a plurality of operating conditions and channeling the determined required flow to the engine component during each respective operating condition of the plurality of operating conditions. The method also includes assessing a health of the engine component. The method further includes modifying the determined cooling flow requirement based on the assessed health of the engine component, and supplying the modified cooling flow requirement to the engine component during each subsequent respective operating condition of the plurality of operating conditions.

18 Claims, 3 Drawing Sheets

(51) Int. Cl.
- *F02C 9/00* (2006.01)
- *G05B 23/02* (2006.01)
- *F02K 3/02* (2006.01)

(52) U.S. Cl.
CPC  *F05D 2270/112* (2013.01); *F05D 2270/3062* (2013.01); *Y02T 50/675* (2013.01)

(58) Field of Classification Search
CPC ....... F05D 2270/112; F05D 2270/3062; Y02T 50/675; F01D 11/24; F01D 25/12
USPC ....................................................... 60/226.1
See application file for complete search history.

(56) References Cited

U.S. PATENT DOCUMENTS

| | | | |
|---|---|---|---|
| 4,856,272 A | 8/1989 | Putman et al. | |
| 5,301,500 A | 4/1994 | Hines | |
| 5,779,436 A | 7/1998 | Glezer et al. | |
| 6,463,380 B1 | 10/2002 | Ablett et al. | |
| 6,935,120 B2* | 8/2005 | Adibhatla | F02C 9/26 60/782 |
| 7,708,518 B2 | 5/2010 | Chehab | |
| 8,602,724 B2 | 12/2013 | Takahashi et al. | |
| 8,616,827 B2 | 12/2013 | O'Leary | |
| 2005/0109016 A1* | 5/2005 | Ullyott | F01D 11/24 60/282 |
| 2007/0180812 A1 | 8/2007 | Adibhatla | |
| 2011/0088405 A1* | 4/2011 | Turco | F01D 5/081 60/782 |
| 2014/0126991 A1* | 5/2014 | Ekanayake | F02C 7/143 415/1 |

OTHER PUBLICATIONS

Shyam, V. et al., "Real-Time Closed Loop Modulated Turbine Cooling," NASA Aeronautics Research Mission Directorate (ARMD), 2014 Seedling Technical Seminar, Feb. 19-27, 2014 (35 pgs.).

* cited by examiner

METHOD AND SYSTEM FOR MODULATED TURBINE COOLING AS A FUNCTION OF ENGINE HEALTH

STATEMENT REGARDING FEDERALLY SPONSORED RESEARCH & DEVELOPMENT

This invention was made with Government support under contract number DTWAFA-10-C-00046 awarded by the Federal Aviation Administration (FAA). The U.S. Government may have certain rights in this invention.

BACKGROUND

The field of the disclosure relates generally to gas turbine engines and, more particularly, to a method and system for modulated turbine cooling as a function of engine health.

Gas turbine engines typically include cooling systems which provide cooling air to turbine rotor components, such as turbine blades, to limit the temperatures experienced by such components. In known cooling systems, the amount of cooling flow is generally fixed at a level required to achieve requisite cooling at the maximum turbine inlet temperature point for the engine. Because gas turbine engines are usually operated at conditions that are at less than maximum turbine inlet temperature, the gas turbine engine normally operates with an excess cooling flow and decreased efficiency. This excess cooling also has the effect of increasing fuel consumption.

BRIEF DESCRIPTION

In one aspect, a modulated turbine cooling (MTC) control system is provided. The MTC control system includes a processor in communication with a memory. The processor is programmed to determine a cooling flow requirement of an engine component for each of a plurality of operating conditions, and channel the determined required flow to the engine component during each respective operating condition of the plurality of operating conditions. The processor is also programmed to assess a health of the engine component. The processor is further programmed to modify the determined cooling flow requirement based on the assessed health of the engine component, and supply the modified cooling flow requirement to the engine component during each subsequent respective operating condition of the plurality of operating conditions.

In another aspect, a method of modulating cooling flow to an engine component based on a health of the engine component is provided. The method includes determining a cooling flow requirement of the engine component for each of a plurality of operating conditions, and channeling the determined required flow to the engine component during each respective operating condition of the plurality of operating conditions. The method also includes assessing a health of the engine component. The method further includes modifying the determined cooling flow requirement based on the assessed health of the engine component, and supplying the modified cooling flow requirement to the engine component during each subsequent respective operating condition of the plurality of operating conditions.

In yet another aspect, a turbofan engine is provided. The turbofan engine includes a core engine including a multi-stage compressor, a fan powered by a turbine driven by gas generated in said core engine, a fan bypass duct at least partially surrounding the core engine and the fan, and a modulated turbine cooling (MTC) control system in communication with at least one engine component of the turbofan engine. The MTC control system includes a processor in communication with a memory. The processor is programmed to determine a cooling flow requirement of the engine component for each of a plurality of operating conditions, and channel the determined required flow to the engine component during each respective operating condition of the plurality of operating conditions. The processor is also programmed to assess a health of the engine component. The processor is further programmed to modify the determined cooling flow requirement based on the assessed health of the engine component, and supply the modified cooling flow requirement to the engine component during each subsequent respective operating condition of the plurality of operating conditions.

DRAWINGS

These and other features, aspects, and advantages of the present disclosure will become better understood when the following detailed description is read with reference to the accompanying drawings in which like characters represent like parts throughout the drawings, wherein.

Figure 1:
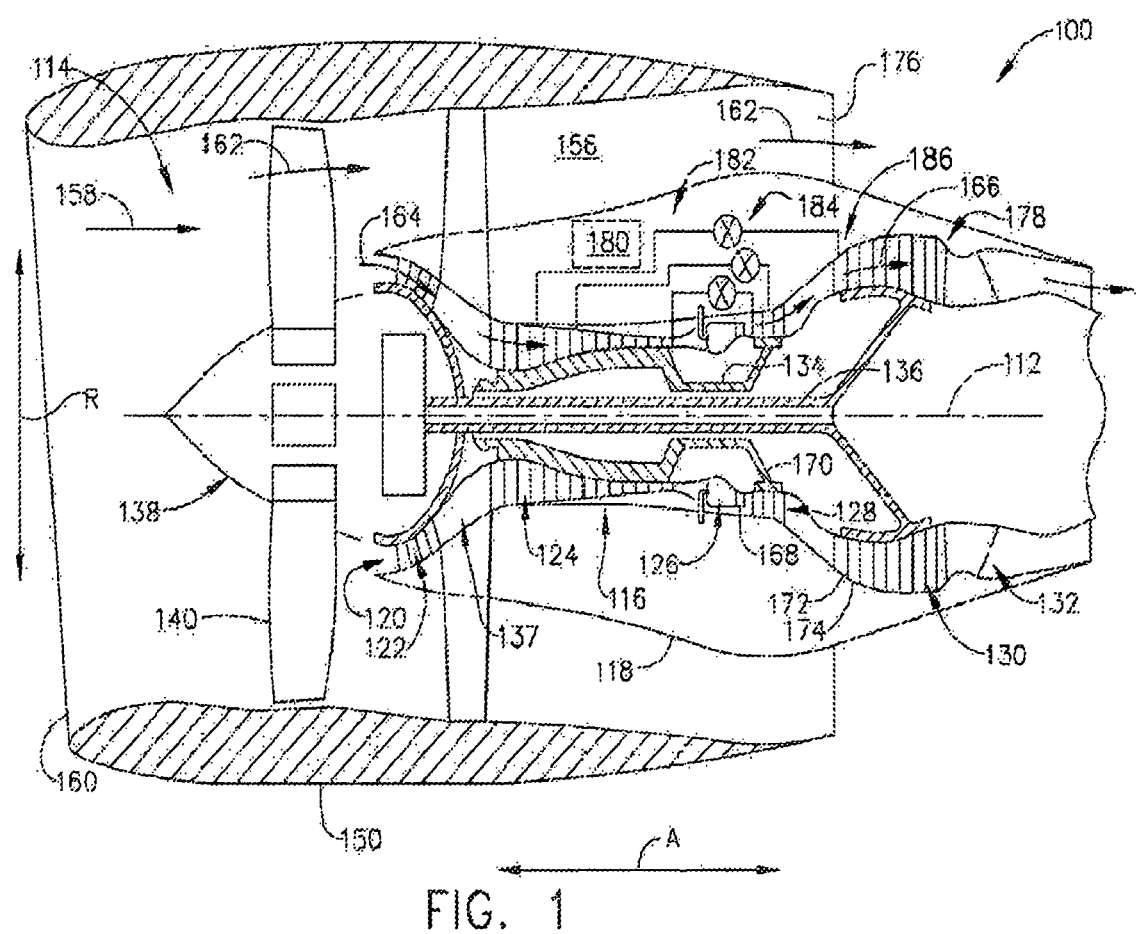
FIG. 1 is a schematic illustration of an exemplary gas turbine engine including a modulated turbine cooling (MTC) control system, in accordance with an example embodiment of the present disclosure.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Embodiments of the modulated turbine cooling (MTC) control systems described herein provide a cost-effective method for modifying an amount of cooling flow channeled to an engine component as a function of engine health and operating condition. Operating conditions may include flight conditions—such as cruise, climb, descent, and take-off—for aircraft engine applications and may further includes engine power level and site conditions—such as temperature, humidity, pressure—for ground- or marine-based manufacturing/industrial power generation applications. The MTC control systems described herein communicate with one or more MTC valves coupled in flow communication with compressor bleed connections. The MTC control system is configured to generate valve positioning commands to adjust a position of one or more MTC valves to thereby modify a cooling flow channeled therethrough. An initial cooling flow is supplied to engine components, specifically one or more turbine components, according to a determined cooling flow required. The MTC control system assesses a health of the engine components using a health model and determines a modified cooling flow to be channeled to the engine components (e.g., more or less cooling flow) as a function of the determined engine health and operating condition. The MTC control system modifies the cooling flow to the engine components in accordance with the determined modified cooling flow. In one embodiment, the cooling flow is modified by the MTC control system by generating modified valve positioning commands to adjust a position of one or more MTC valves. In cases where the cooling flow is reduced, by eliminating unnecessary cooling flow during one or more operating conditions (such as a cruise flight condition), specific fuel consumption (SFC) of an aircraft engine may be reduced. In cases where additional cooling flow is required, the MTC control system may extend the life of one or more engine components by adjusting, in real-time, the cooling flow required according to the health of the engine components and the operating conditions. For example, by increasing a cooling flow during a take-off or climb flight condition, engine tine-on-wing may be increased.

FIG. 1 is a schematic cross-sectional view of a gas turbine engine 100 in accordance with an exemplary embodiment of the present disclosure. In the example embodiment, gas turbine engine 100 is embodied in a high-bypass turbofan jet engine. As shown in FIG. 1, turbofan engine 100 defines an axial direction A (extending parallel to a longitudinal centerline 112 provided for reference) and a radial direction R. In general, turbofan engine 100 includes a fan assembly 114 and a core engine 116 disposed downstream from fan assembly 114.

In the example embodiment, core engine 116 includes an approximately tubular outer casing 118 that defines an annular inlet 120. Outer casing 118 encases, in serial flow relationship, a compressor section including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects HP turbine 128 to HP compressor 124. A low pressure (LP) shaft or spool 136 drivingly connects LP turbine 130 to LP compressor 122. The compressor section, combustion section 126, the turbine section, and nozzle section 132 together define a core air flowpath 137.

During operation of turbofan engine 100, a volume of air 158 enters turbofan engine 100 through an associated inlet 160 of fan assembly 114, which includes fan 138. As volume of air 158 passes across a plurality of fan blades 140 of fan 138, a first portion 162 of volume of air 158 is directed or routed into a bypass airflow passage 156 (between core engine 116 and an annular nacelle 150) and a second portion 164 of volume of air 158 is directed or routed into core air flowpath 137, or more specifically into LP compressor 122. A ratio between first portion 162 and second portion 164 is commonly referred to as a bypass ratio. The pressure of second portion 164 is then increased as it is routed through high pressure (HP) compressor 124, and into combustion section 126, where it is mixed with fuel and burned to provide combustion gases 166.

Combustion gases 166 are routed through HP turbine 128 where a portion of thermal and/or kinetic energy from combustion gases 166 is extracted via sequential stages of HP turbine stator vanes 168 that are coupled to outer casing 118 and HP turbine rotor blades 170 that are coupled to HP shaft or spool 134, thus causing HP shaft or spool 134 to rotate, which then drives a rotation of HP compressor 124. Combustion gases 166 are then routed through LP turbine 130 where a second portion of thermal and kinetic energy is extracted from combustion gases 166 via sequential stages of LP turbine stator vanes 172 that are coupled to outer casing 118 and LP turbine rotor blades 174 that are coupled to LP shaft or spool 136, which drives a rotation of LP shaft or spool 136 and LP compressor 122 and/or rotation of fan 138.

Combustion gases 166 are subsequently routed through jet exhaust nozzle section 132 of core engine 116 to provide propulsive thrust. Simultaneously, the pressure of first portion 162 is substantially increased as first portion 162 is routed through bypass airflow passage 156 before it is exhausted from a fan nozzle exhaust section 176 of turbofan engine 100, also providing propulsive thrust. HP turbine 128, LP turbine 130, and jet exhaust nozzle section 132 at least partially define a hot gas path 178 for routing combustion gases 166 through core engine 116.

In the illustrated embodiment, turbofan engine 100 further includes a modulated turbine cooling (MTC) control system 180. MTC control system 180 is configured to control (e.g., modulate) channeling of cooling air from one of more compressor bleed connection(s) 182 to one or more MTC valves 184. Cooling air is channeled through one or more conduits 186 (e.g., pipes, tubes, manifolds, etc.). In the example embodiment, MTC control system 180 modulates the flow of cooling air through MTC valve(s) 184 as a function of operating condition and engine health. Turbofan engine 100 is depicted in FIG. 1 by way of example only, and in other exemplary embodiments, turbofan engine 100 may have any other suitable configuration including for example, a turboprop engine. Moreover, turbofan engine 100 may have a configuration suitable for use in aircraft applications as well as ground- and/or marine-based manufacturing and/or industrial applications.

Figure 2:
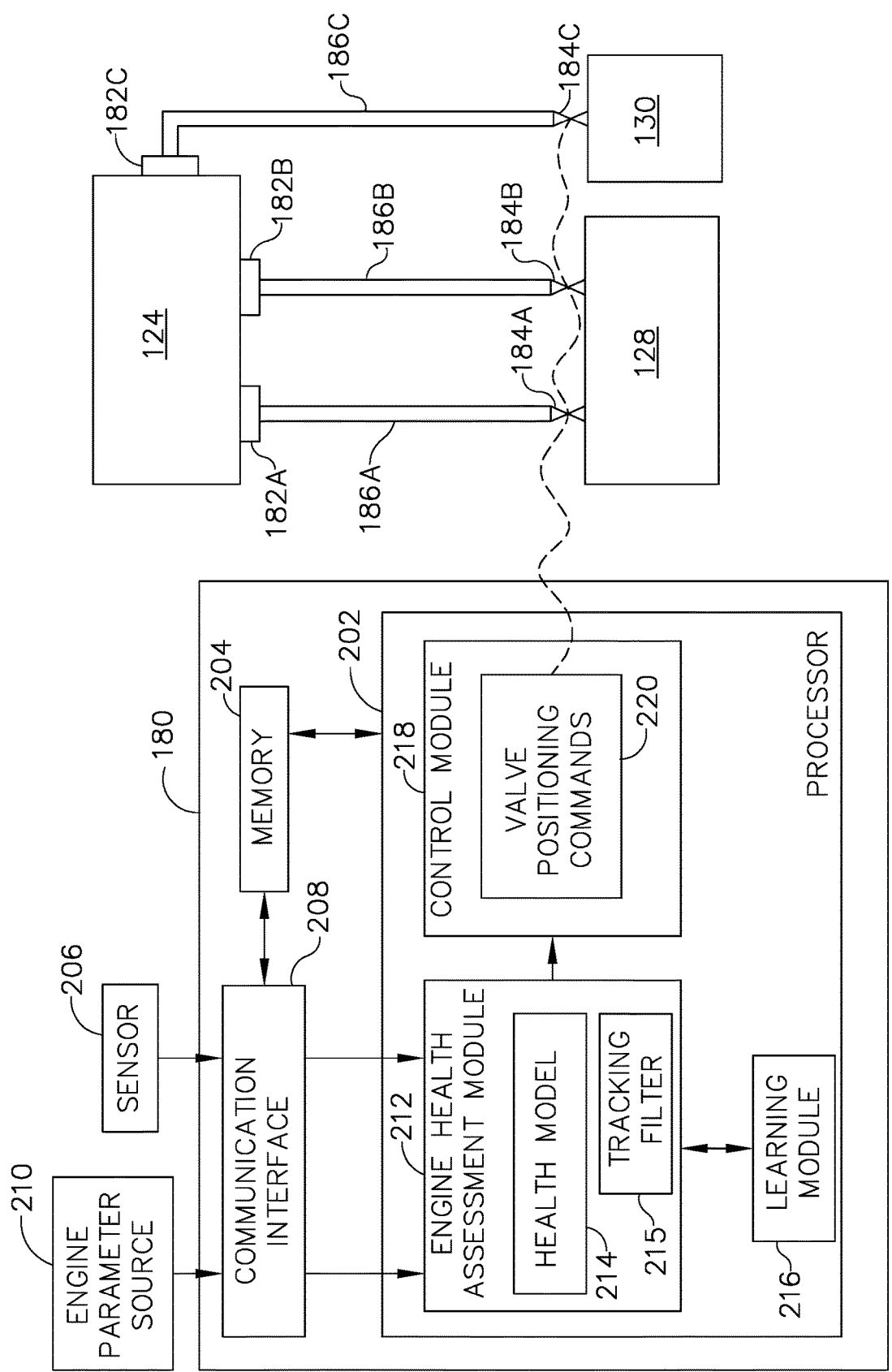
FIG. 2 is a schematic diagram illustrating the MTC control system as shown in FIG. 1.

FIG. 2 is a schematic block diagram 200 further illustrating MTC control system 180 (shown in FIG. 1). In the illustrated embodiment, MTC control system 180 is configured to control a flow of cooling air to turbine(s) 128 and/or 130 (both also shown in FIG. 1) more efficiently by cooling as a function of operating condition as well as a measured or estimated engine health. Measuring and/or estimating an actual level of health (e.g., an amount of deterioration) of engine 100 (also shown in FIG. 1) using MTC control system 180 facilitates implementing an accurate cooling flow schedule either in new efficient engines 100 and/or in existing engines 100. Accordingly, specific fuel consumption (SFC) may be reduced and a performance of engine 100 may be improved. Moreover, adjustment of cooling flow for deteriorated engines 100 may also be improved, facilitating extending the life of engine 100 (and/or specific components thereof), such as improving time-on-wing of an aircraft engine 100.

MTC control system 180 includes and/or is in communication with one or more MTC valves 184 to adjust positioning thereof to modify a cooling flow to components of engine 100. In the illustrated embodiment, three compressor bleed connections 182A, 182B, 182C are coupled in flow communication to three MTC valves 184A, 184B, 184C, respectively. However, it should be understood that this example is non-limiting and is illustrated for example only; any number of other MTC arrangements are contemplated and may be employed without departing from the scope of the present disclosure. A first compressor bleed connection 182A corresponding to a discharge region of HP compressor 124 (shown in FIG. 1) is connected via a first conduit 186A to a first MTC valve 184A corresponding to early stage HP turbine rotor blades 170 (also shown in FIG. 1). In other words, compressor 124 discharge air is used to cool early stage HP turbine rotor blades 170. A second compressor bleed connection 182B corresponding to a later stage of HP compressor 124 is connected via a second conduit 186B to a second MTC valve 184B corresponding to early stage vanes of HP turbine 128. In other words, late stage air of HP compressor 124 is used to cool early stage vanes of HP turbine 128. A third compressor bleed connection 182C corresponding to an early or middle stage of HP compressor 124 is connected via third conduit 186C to a third MTC valve 184C corresponding to LP turbine 130. In other words, early or middle stage air of HP compressor 124 is used to cool LP turbine 130. It should be understood that, in other embodiments, more or less than three bleed connections 182, MTC valves 184, and/or conduits 186 may be present in engine 100 without departing from the scope of the present disclosure. Additionally or alternatively, MTC valves 184 may be coupled in flow communication with other components of engine 100 than turbines 128, 130 to provide cooling flow thereto in accordance with the present disclosure.

In one embodiment, MTC control system 180 includes or is integral to a full authority digital engine control (FADEC) computer system of an aircraft (not shown) including turbofan engine 100. MTC control system 180 is configured to modulate flow of cooling air to one or more of turbines 128 and 130 as a function of a health of engine 100 and a operating condition. In particular, in one embodiment, MTC control system 180 is configured to monitor the health of engine 100 in real-time while operating engine 100 under various operating conditions. Operating conditions may include flight conditions (which may also be referred to as "flight phases" herein), for example, take-off, climb, cruise, and descent. Operating conditions may further include operating conditions of ground- and/or marine-based manufacturing/industrial power generation engines 100, including temperature, humidity, pressure, and/or any other operating conditions thereof. In one embodiment, as engine 100 health degrades, for example, due to deterioration, dirt, and/or wear, MTC control system 180 is configured to increase cooling flow to turbines 128 and/or 130 (and/or other components of engine 100). In another embodiment, for newer and/or more efficient engines 100, MTC control system 180 is configured to decrease unnecessary cooling flow to turbines 128 and/or 130 (and/or other components of engine 100), thereby reducing SFC and/or improving time-on-wing (for aircraft engines 100).

In the illustrated embodiment, MTC control system 180 includes a processor 202 and a memory 204, and is in communication with at least one engine sensor 206 and source(s) of engine parameters 210, such as operating condition data, altitude, and/or Mach number. In one particular embodiment, sensor 206 is configured to measure a health of engine 100. It should be understood that the health of engine 100 refers collectively to the health of any components of engine 100, and sensor(s) 206 may be configured to measure the health of individual components for assessment. Sensor (s) 206 may be virtual sensors, in some embodiments. Sensors 206 may positioned throughout engine 100, for example, in and/or adjacent to one of fan 138 (shown in FIG. 1), HP compressor 124, HP turbine 128, LP turbine 130, and/or any other component of engine 100. MTC control system 180 further includes a communication interface 208, such that MTC control system 180 is capable of communicating with a remote device such as sensor 206 and one or more aircraft control systems or other sources of engine parameters 210. Communication interface 208 may include, for example, a wired or wireless network adapter or a wireless data transceiver for use with a network. For example, communication interface 208 may be in wired or wireless communication with an aircraft control system or other source(s) of engine parameters 210 and may receive signals (e.g., requests, instructions, values) therefrom.

Processor 202 is configured to execute computer-readable instructions (stored, for example, in memory 204) to implement an engine health assessment module 212. Engine health assessment module 212 is configured to process sensor data from sensor(s) 206 and/or engine parameters from source(s) 210 to estimate the health of engine 100 throughout the lifetime thereof. It should be understood that engine health assessment module 212 may be configured to monitor the health of particular component(s) of engine 100, such as HP compressor 124. In one embodiment, engine health assessment module 212 includes a health model 214, which includes or is otherwise in communication with a tracking filter 215. Health model 214 models expected engine conditions and aircraft parameters according to operating condition, engine age, time-on-wing, and/or other parameters. Tracking filter 215, put broadly, is a parameter estimation algorithm used to tune or calibrate health model 214 in accordance with actual engine characteristics, as determined using sensor data from sensor(s) 206 and/or engine parameters from source(s) 210. In other words, tracking filter 215 identifies discrepancies between health model 214 and actual engine conditions and tunes health model 214 accordingly. Engine health assessment module 212 is configured to monitor these discrepancies as an estimation of the health of engine 100.

Processor 202 further includes a control module 218 configured to use an output from engine health assessment module 212 to generate valve positioning commands 220. In addition, output from engine health assessment module 212 may be stored in a learning module 216 and/or retrieved therefrom for calibration purposes (e.g., calibration of health model 214 and/or of other aircraft systems, not shown in FIG. 2). Control module 218 (and/or any other component of processor 202 and/or MTC control system 180) is further configured to use valve positioning commands 220 to adjust a position of at least one MTC valve 184, such that cooling flow to one or more of turbines 128 and/or 130 is adjusted. For example, when engine health assessment module 212 determines that the health of engine 100 has deteriorated past a threshold level, control module 218 may generate and use valve positioning commands 220 to further open one or more MTC valves 184 to increase cooling to turbines 128 and/or 130 during a particular operating condition. Accordingly, a modified (increased) cooling flow to the corresponding engine component is provided.

In the example embodiment, MTC control system 180 uses initial parameters in engine health assessment module 212 (e.g., expected parameters for a new engine 100, or worst-case parameters for a deteriorated engine 100) to determine a cooling flow requirement of an engine component, such as HP turbine 128 and/or LP turbine 130. MTC control system 180 determines cooling flow requirements for each component for each of a plurality of operating conditions. For example, for an aircraft engine 100, more cooling flow may be required during particular flight conditions, such as take-off and climb, than during cruise. Continuing with the example of an aircraft engine 100, MTC control system 180 is configured to initially channel the required cooling flow to each component during the various flight conditions, as initially determined. In one embodiment, control module 218 of MTC control system 180 sets valve positioning commands 220 to an initial state for each flight condition, such that MTC valves 184 are appropriately positioned at each flight conditions to provide the required cooling flow to each component.

MTC control system 180 assesses an actual health of engine 100, for example, using engine health assessment module 212 as described above. In one embodiment, MTC control system 180 assesses the health of engine 100 in real-time, during operation of engine 100 (and components thereof, such as turbine(s) 128 and/or 130). MTC control system 180 modifies a cooling flow requirement of one or more components of engine 100 based on the assessed health of engine 100. For example, MTC control system 180 may determine that more cooling flow than is necessary is being channeled to one of turbines 128, 130 during one or more flight conditions, such as cruise. Accordingly, control module 218 of MTC control system 180 generates updated or modified valve positioning commands 220 to modify a position of one or more MTC valves 184 corresponding to the one of turbines 128, 130. The valve positioning commands 220 are set to a modified state, such that corresponding MTC valve(s) 184 are positioned to channel less cooling flow to the corresponding one of turbine 128, 130 during cruise. In such a case, SFC may be reduced, compared to channeling the unmodified cooling flow to the component of engine 100.

In some embodiments, control module 218 may modify valve positioning commands 220 individually for particular MTC valves 184 at particular operating conditions (e.g., one update the position of one MTC valve 184 during one flight conditions, such as cruise). In other embodiments, control module 218 may update valve positioning commands 220 for all operating conditions for one MTC valve 184 (e.g., may modify valve positioning commands 220 for one valve 184 for all flight conditions by the same adjustment amount or by a scaled adjustment amount corresponding to the respective flight condition). Once the valve positioning commands 220 are modified, MTC control system 180 controls MTC valves 184 to supply the modified cooling flow to the corresponding components of engine 100.

Figure 3:
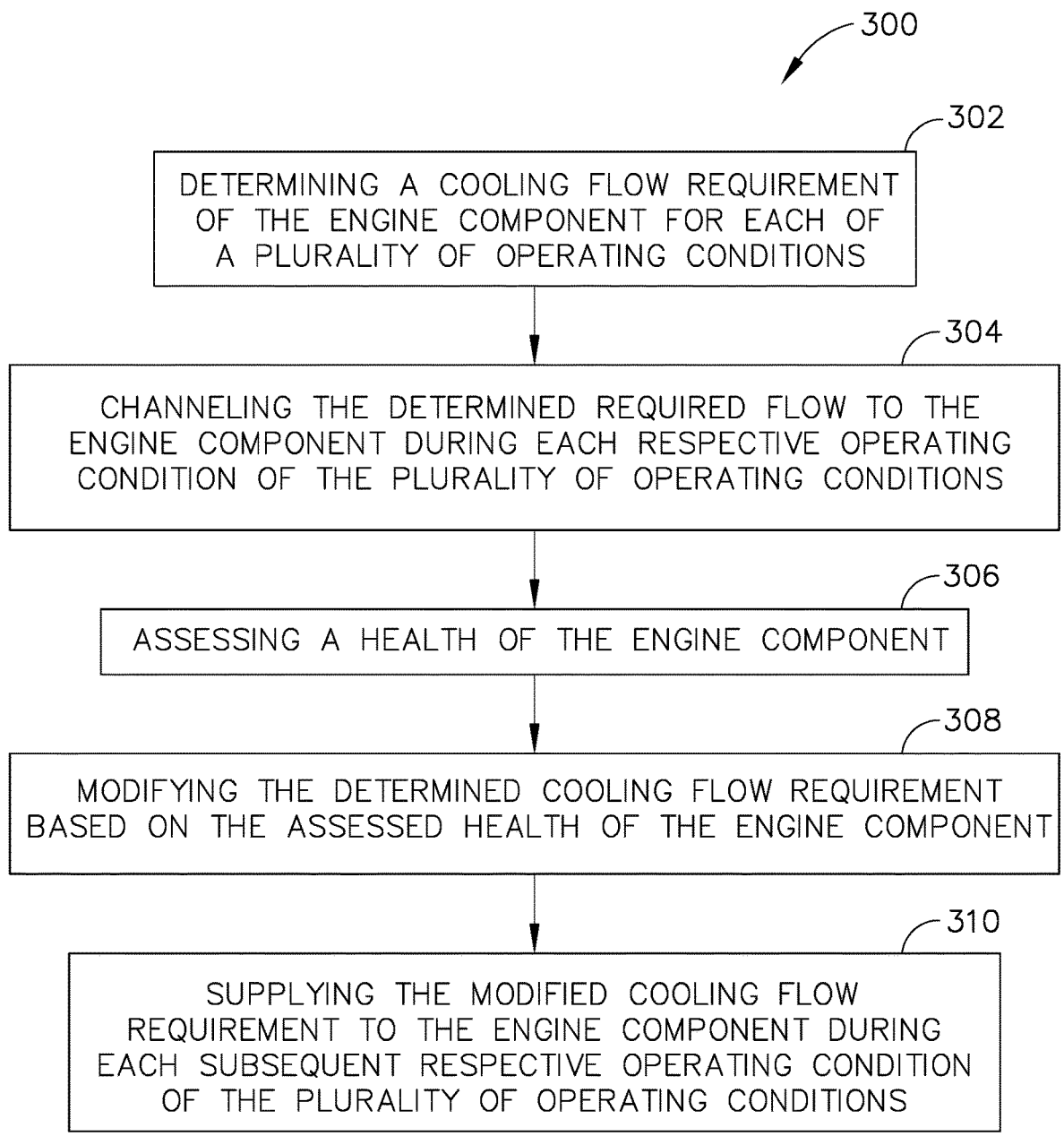
FIG. 3 is a simplified diagram of an example method of modulating cooling flow to an engine component based on a health of the engine component.

FIG. 3 is a simplified diagram of a method 300 of modulating cooling flow to an engine component based on a health of the engine component. Certain steps of method 300 may be implemented by modulated turbine cooling (MTC) control system 180 (shown in FIG. 1). Method 300 includes determining 302 a cooling flow requirement of the engine component (e.g., one or more of HP turbine 128 and/or LP turbine 130, both shown in FIG. 1) for each of a plurality of operating conditions. Method 300 also includes channeling 304 the determined required flow to the engine component during each respective operating condition of the plurality of operating conditions. Method 300 includes assessing 306 a health of the engine component. Method 300 further includes modifying 308 the determined cooling flow requirement based on the assessed health of the engine component, and supplying 310 the modified cooling flow requirement to the engine component during each subsequent respective operating condition of the plurality of operating conditions.

The above-described modulated turbine cooling (MTC) systems provide an efficient method for modulated cooling of gas turbine engine turbine components. Specifically, the above-described MTC control system includes an engine health assessment module configured to assess an engine health and a control module configured to generate valve positioning commands based on the health of the engine and the operating condition. Accordingly, the above-described MTC control system supplies modified cooling flow to turbine components as a function of engine health and operating conditions, such that newer engines are supplied less unnecessary cooling during certain operating conditions, and older engines may be sufficiently cooled as function of deterioration.

An exemplary technical effect of the methods, systems, and apparatus described herein includes at least one of: (a) modulating turbine cooling as a function of actual cooling needed, according to flight condition and engine health; (b) reducing specific fuel consumption due to such modulating; (c) extended lifetime (e.g., time-on-wing) of engines and/or components thereof due to increased cooling flow thereto as a function of engine deterioration; and/or (d) improved real-time control reaction to actual engine conditions over "worst-case scenario" operation.

Exemplary embodiments of modulated turbine cooling systems are described above in detail. The modulated turbine cooling systems, and methods of operating such systems and component devices are not limited to the specific embodiments described herein, but rather, components of the systems and/or steps of the methods may be utilized independently and separately from other components and/or steps described herein. For example, the methods may also be used in combination with other systems requiring channeling of turbine flow to system components, and are not limited to practice with only the systems and methods as described herein. Rather, the exemplary embodiment can be implemented and utilized in connection with many other machinery applications that are currently configured to receive and accept modulated cooling systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A modulated turbine cooling (MTC) control system comprising a processor in communication with a memory, wherein said processor is programmed to:
   determine a first cooling flow requirement of an engine component for each of a plurality of operating conditions comprising one or more flight conditions, wherein the flight conditions includes at least a takeoff condition, a climb condition, a cruise condition, and a descent condition;
   channel the first cooling flow requirement to the engine component during each respective operating condition of the plurality of operating conditions;
   assess a health of the engine component;
   determine a second cooling flow requirement based on the first cooling flow requirement, the assessed health of the engine component, and the flight condition; and
   supply the second cooling flow requirement to the engine component during each subsequent respective operating condition of the plurality of operating conditions.

2. The MTC control system of claim 1, wherein said processor is further programmed to assess the health of the engine component in real-time during operation of the engine component.

3. The MTC control system of claim 1, wherein said processor is further programmed to modulate a position of a valve configured to supply the second cooling flow requirement.

4. The MTC control system of claim 1, wherein said processor is further programmed to assess the health of the engine component using at least one of one or more sensors, one or more virtual sensors, and one or more models of the engine component.

5. The MTC control system of claim 4, wherein said processor is further programmed to estimate the health of the engine component using a health model and a parameter estimation algorithm.

6. A method of modulating cooling flow to an engine component based on a health of the engine component, said method performed by a processor in communication with a memory, the processor configured to execute steps of the method comprising:
   determining a first cooling flow requirement of the engine component for each of a plurality of operating conditions, the plurality of operating conditions comprising one or more flight conditions, wherein the flight conditions includes at least a takeoff condition, a climb condition, a cruise condition, and a descent condition;
   channeling the first cooling flow requirement to the engine component during each respective operating condition of the plurality of operating conditions;
   assessing a health of the engine component;
   determining a second cooling flow requirement based on the first cooling flow requirement, the assessed health of the engine component, and the flight condition; and
   supplying the second cooling flow requirement to the engine component during each subsequent respective operating condition of the plurality of operating conditions.

7. The method of claim 6, wherein assessing the health of the engine component comprises assessing the health of the engine component in real-time during operation of the engine component.

8. The method of claim 6, wherein the engine component is one of a plurality of gas turbine engine components, and wherein supplying the second cooling flow requirement to the engine component during each subsequent respective operating condition of the plurality of operating conditions comprises at least one of:
   reducing a specific fuel consumption (SFC) of the gas turbine engine during operation when supplying the second cooling flow requirement to the engine component compared to channeling the first cooling flow to the engine component, and
   increasing a time-on-wing of the gas turbine engine when supplying the second cooling flow requirement to the engine component compared to channeling the first cooling flow to the engine component.

9. The method of claim 6, wherein supplying the second cooling flow requirement to the engine component during each subsequent respective operating condition of the plurality of operating conditions comprises modulating a position of a valve configured to supply the second cooling flow requirement.

10. The method of claim 6, wherein assessing the health of the engine component comprises assessing the health of the engine component using at least one of one or more sensors, one or more virtual sensors, and one or more models of the engine component.

11. The method of claim 10, wherein assessing the health of the engine component comprises estimating the health of the engine component using a health model and a parameter estimation algorithm.

12. A turbofan engine comprising:
   a core engine including a multistage compressor;
   a fan powered by a turbine driven by gas generated in said core engine;
   a fan bypass duct at least partially surrounding said core engine and said fan; and
   a modulated turbine cooling (MTC) control system in communication with at least one engine component of said turbofan engine, said MTC control system comprising a processor in communication with a memory, wherein said processor is programmed to:
   determine a first cooling flow requirement for a health of the engine component for each of a plurality of operating conditions comprising one or more flight conditions, wherein the flight conditions includes at least a takeoff condition, a climb condition, a cruise condition, and a descent condition;
   channel the first cooling flow requirement to the engine component during each respective operating condition of the plurality of operating conditions;
   estimate the health of the engine component using a health model and a parameter estimation algorithm;
   assess the health of the engine component;
   determine modify the determined a second cooling flow requirement based on the first cooling flow requirement, the assessed health of the engine component, and the flight condition; and
   supply the second cooling flow requirement to the engine component during each subsequent respective operating condition of the plurality of operating conditions.

13. The turbofan engine of claim 12, wherein said processor is further programmed to assess the health of the engine component in real-time during operation of the engine component.

14. The turbofan engine of claim 12, wherein said processor is further programmed to modulate a position of a valve configured to supply the second cooling flow requirement.

15. The turbofan engine of claim 12, wherein said processor is further programmed to assess the health of the engine component using at least one of one or more sensors, one or more virtual sensors, and one or more models of the engine component.

16. The turbofan engine of claim 12, wherein said engine component comprises the turbine, and wherein said first cooling flow requirement is channeled from said compressor to said turbine.

17. The turbofan engine of claim 12, wherein determining the second cooling flow requirement based on the first cooling flow requirement, the assessed health of the engine component and the flight condition includes decreasing cooling flow to said turbine at the cruise condition relative to one or more of the takeoff condition or the climb condition.

18. The turbofan engine of claim 12, wherein said processor is further programmed to increase a time-on-wing of the turbofan engine, or reduce a specific fuel consumption (SFC) of the turbofan engine, or both, during operation when supplying the second cooling flow requirement to the engine component compared to channeling the first cooling flow requirement to the engine component.

* * * * *